(12) United States Patent
Michihata et al.

(10) Patent No.: US 9,778,971 B2
(45) Date of Patent: Oct. 3, 2017

(54) SLAVE DEVICE, MASTER DEVICE, AND COMMUNICATION METHOD

(75) Inventors: Satoshi Michihata, Tokyo (JP); Kiyoyasu Maruyama, Tokyo (JP); Satoko Miki, Tokyo (JP); Tomonori Fukuta, Tokyo (JP); Kazuhiro Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 146 days.

(21) Appl. No.: 14/131,717

(22) PCT Filed: Jan. 20, 2012

(86) PCT No.: PCT/JP2012/051193
§ 371 (c)(1),
(2), (4) Date: Jan. 9, 2014

(87) PCT Pub. No.: WO2013/046734
PCT Pub. Date: Apr. 4, 2013

(65) Prior Publication Data
US 2014/0149805 A1    May 29, 2014

(30) Foreign Application Priority Data

Sep. 27, 2011  (JP) .................................. 2011-211339

(51) Int. Cl.
| | |
|---|---|
| G06F 1/30 | (2006.01) |
| G06F 11/07 | (2006.01) |
| G06F 13/42 | (2006.01) |

(52) U.S. Cl.
CPC ...... *G06F 11/0751* (2013.01); *G06F 13/4282* (2013.01)

(58) Field of Classification Search
USPC .......................................... 714/47.2
See application file for complete search history.

(56) References Cited

U.S. PATENT DOCUMENTS

| | | | | |
|---|---|---|---|---|
| 6,145,102 | A  * | 11/2000 | Klein .................. | G06F 11/0745 714/47.1 |
| 6,597,197 | B1 * | 7/2003 | Mosley ..................... | H04L 5/18 326/63 |
| 6,691,257 | B1 * | 2/2004 | Suffin .................. | G06F 11/2005 714/43 |
| 6,728,908 | B1 * | 4/2004 | Fukuhara .............. | H04L 1/0061 714/43 |

(Continued)

FOREIGN PATENT DOCUMENTS

| | | |
|---|---|---|
| CN | 1845525 A | 10/2006 |
| JP | 8-314814 A | 11/1996 |

(Continued)

*Primary Examiner* — Kamini Patel
(74) *Attorney, Agent, or Firm* — Birch, Stewart, Kolasch & Birch, LLP

(57) ABSTRACT

A slave device is equipped with: a parameter setting portion for setting different values according to the content of commands sent from a master device, as parameter values for detecting anomalies; and an anomaly detecting portion for detecting anomalies by comparing the time corresponding to a parameter value that has been set by the parameter setting portion and the measured time of a process carried out in response to a command.

21 Claims, 13 Drawing Sheets

(56) References Cited

U.S. PATENT DOCUMENTS

| | | | |
|---|---|---|---|
| 2002/0078294 A1* | 6/2002 | Tsuchida | G11C 7/1072 |
| | | | 711/105 |
| 2006/0242348 A1* | 10/2006 | Humphrey | G06F 13/4291 |
| | | | 710/305 |
| 2007/0022363 A1* | 1/2007 | Aldereguia | G06F 11/2007 |
| | | | 714/800 |
| 2010/0131699 A1* | 5/2010 | Luukkainen | G06F 12/0246 |
| | | | 711/103 |
| 2011/0197001 A1 | 8/2011 | Hsieh | |
| 2012/0246510 A1* | 9/2012 | Kojina | G06F 13/4282 |
| | | | 714/4.5 |
| 2014/0258576 A1* | 9/2014 | Maruyama | H04L 69/22 |
| | | | 710/110 |
| 2015/0134764 A1* | 5/2015 | Noebauer | H04L 67/12 |
| | | | 709/208 |
| 2015/0248373 A1* | 9/2015 | Sengoku | H03M 13/096 |
| | | | 714/56 |

FOREIGN PATENT DOCUMENTS

| | | |
|---|---|---|
| JP | 8-316973 A | 11/1996 |
| JP | 11-502643 A | 3/1999 |
| JP | 2004-139528 A | 5/2004 |
| JP | 2008-197752 A | 8/2008 |
| JP | 2011-70282 A | 4/2011 |

\* cited by examiner

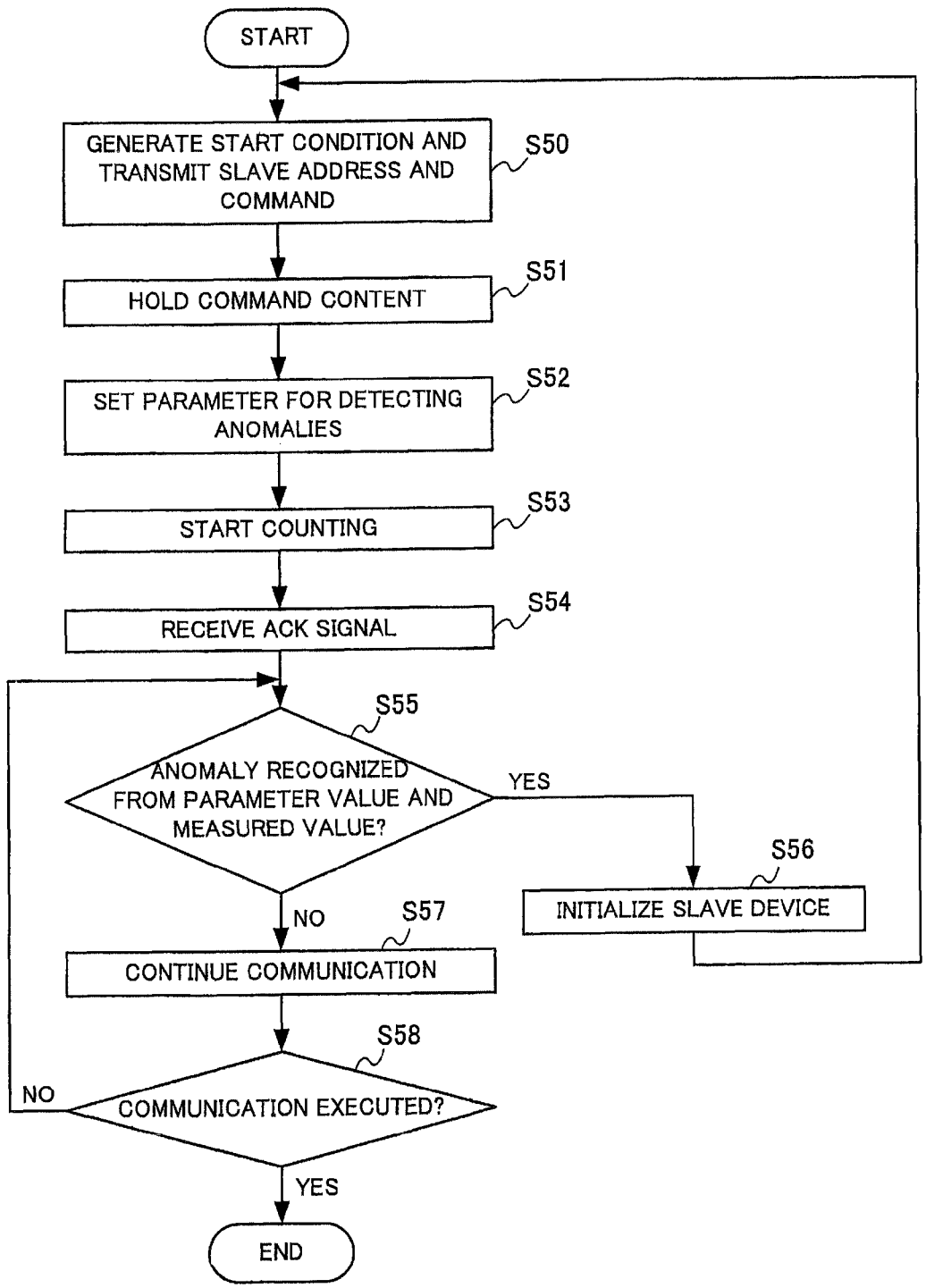

SLAVE DEVICE, MASTER DEVICE, AND COMMUNICATION METHOD

TECHNICAL FIELD

The present invention relates to a slave device, a master device, and a communication method for communicating in accordance with the IIC (Inter Integrated Circuit) protocol.

BACKGROUND ART

Communication methods using the IIC protocol have long been used to communicate between different devices in electronic apparatus through two signal lines: a serial clock line referred to as the SCL line and a serial data line referred to as the SDA line. In IIC communication, while processing a command, a slave device can hold the SCL signal at the low level to indicate that it is busy and suspend data transmission to the master device.

The slave device may also hold the SCL signal at the low level, however, when it fails to receive the SCL and SDA signals sent from the master device correctly. To address this issue, Patent Reference 1 describes a communication system in which the master and slave devices are interconnected by a report line for reporting anomalies. In the communication system described in Patent Reference 1, when an anomaly is detected by a detection means provided for detecting anomalies occurring in IIC communication, one of the devices notifies the other device of the occurrence of the anomaly through the report line.

PRIOR ART REFERENCES

Patent References

Patent Reference 1: Japanese Patent Application Publication No. 2011-70282

SUMMARY OF THE INVENTION

Problems to be Solved by the Invention

The communication system described in Patent Reference 1 detects the occurrence of an anomaly when the SCL signal is held at a prescribed level for a prescribed time or longer. The period of time for which the slave device holds the SCL signal at the low level, however, differs depending on the content of the command received from the master device, so there have been cases of performing device recovery processing during normal operation by false detection of anomalies.

An object of the invention is therefore to prevent false detection of the occurrence of anomalies.

Means for Solving the Problem

A slave device according to one aspect of the invention is a slave device that operates in the slave mode in accordance with the IIC protocol. The slave device comprises a parameter setting portion for setting, as values of a parameter for detecting anomalies, different values according to the command content of commands transmitted from a master device operating in the master mode in accordance with the IIC protocol, and an anomaly detecting portion for detecting the anomalies by comparing a time corresponding to the parameter value set by the parameter setting portion with time measured in processing performed according the commands.

A master device according to another aspect of the invention is a master device operative in the master mode in accordance with the IIC protocol. The master device comprises a parameter setting portion for setting, as values of a parameter for detecting anomalies, different values according to the command content of commands that the master device transmits to a slave device operating in the slave mode in accordance with the IIC protocol, and an anomaly detecting portion for detecting the anomalies by comparing a time corresponding to the parameter value set by the parameter setting portion with time measured in processing performed in accordance with the commands.

A communication method according to another aspect of the invention is a communication method carried out by a slave device operating in the slave mode in accordance with the IIC protocol. The communication method comprises a parameter setting process for setting, as values of a parameter for detecting anomalies, different values according to the command content of commands transmitted from a master device operating in the master mode in accordance with the IIC protocol, and an anomaly detecting process for detecting the anomalies by comparing a time corresponding to the parameter value set by the parameter setting process with time measured in processing performed in accordance with the commands.

A communication method according to another aspect of the invention is a communication method carried out by a master device operating in the master mode in accordance with the IIC protocol. The communication method comprises a parameter setting process for setting, as values of a parameter for detecting anomalies, different values according to the command content of commands transmitted to a slave device operating in the slave mode in accordance with the IIC protocol, and an anomaly detecting process for detecting the anomalies by comparing a time corresponding to the parameter value set by the parameter setting process with time measured in processing performed in accordance with the commands.

Effects of the Invention

According to one embodiment of the invention, it is possible to prevent false detection of anomalies.

BRIEF DESCRIPTION OF THE DRAWINGS

FIG. 15 is a flowchart illustrating processing in the master device in the fourth embodiment.

MODE FOR CARRYING OUT THE INVENTION

First Embodiment

Figure 1:
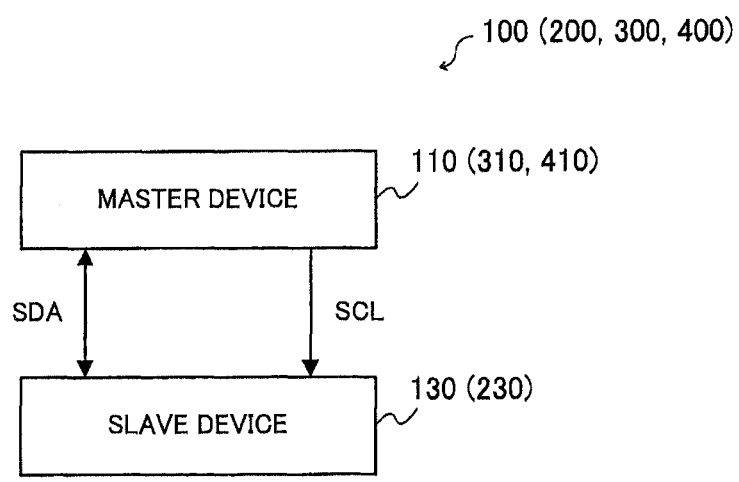
FIG. 1 is a schematic drawing showing the configuration of a communication system according to first to fourth embodiments.

FIG. 1 is a schematic diagram illustrating the configuration of a communication system 100 according to the first embodiment. The communication system 100 includes a master device 110 and a slave device 130. The reference characters in parentheses indicate components in the second to fourth embodiments.

The master device 110 is a communication device operating in the master mode. The slave device 130 is a communication device operating in the slave mode. The master device 110 and slave device 130 are interconnected by a serial data line SDA and a serial clock line SCL and communicate in accordance with the IIC protocol. FIG. 1 shows a single slave device 130, but there may be more.

Figure 2:
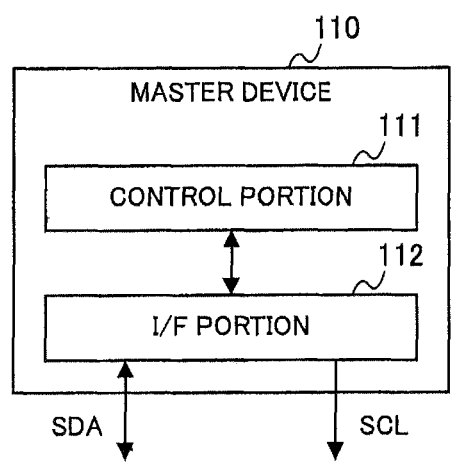
FIG. 2 is a block diagram schematically illustrating the configuration of the master device in the first embodiment.

FIG. 2 is a block diagram schematically illustrating the configuration of the master device 110. The master device 110 includes a control portion 111 and an interface unit 112 (referred to below as an I/F portion).

The control portion 111 controls communication in accordance with the IIC protocol. For example, the control portion 111 transmits, through the I/F portion 112, a start condition as a unique state called, the slave address of the slave device 130 with which the master device is communicating, and a command indicating processing that the slave device 130 is to carry out, and carries out processing as required according to the indicated command content. During communication with the slave device 130, the control portion 111 controls the clock signal on the SCL line through the I/F portion 112.

During communication with the slave device 130 according to the IIC protocol, the slave device 130 may initialize (reset) the communication, in which case the control portion 111 carries out processing to restart the initialized communication.

The I/F portion 112 executes communication through the SDA and SCL lines under control from the control portion 111.

Figure 3:
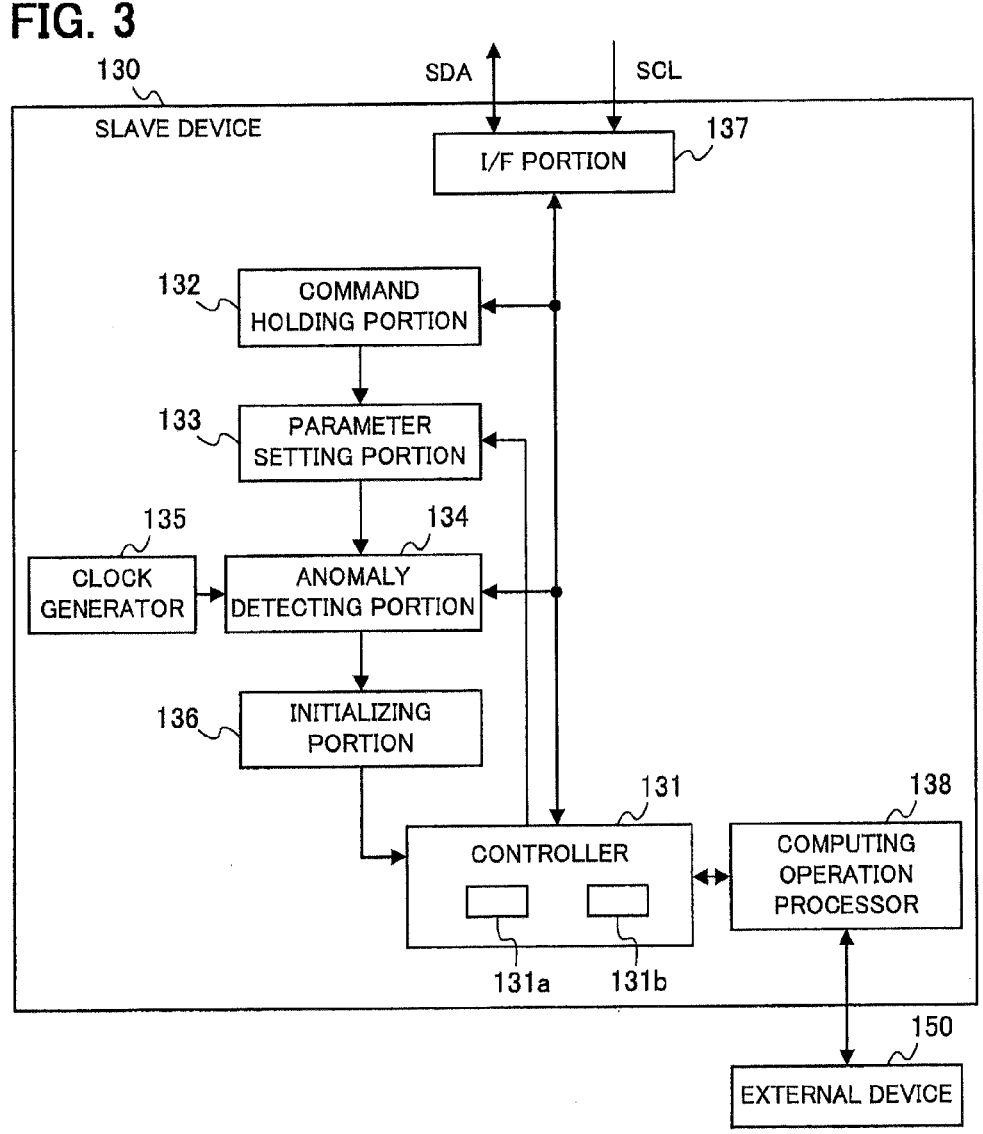
FIG. 3 is a block diagram schematically illustrating the configuration of the slave device in the first embodiment.

FIG. 3 is a block diagram schematically illustrating the configuration of the slave device 130. The slave device 130 includes a controller 131, a command holding portion 132, a parameter setting portion 133, an anomaly detecting portion 134, a clock generator 135, an initializing portion 136, an I/F portion 137, and a computing operation processor 138.

The controller 131 controls communication in accordance with the IIC protocol.

In addition, when the controller 131 receives a reset signal from the initializing portion 136, it initializes (resets) the communication process, and returns to the state in which it waits for a command from the master device 110.

Furthermore, the controller 131 provides parameter values to the parameter setting portion 133 according to the content of commands from the master device 110. For example, in a 'read' or 'write' operation, the controller 131 notifies the parameter setting portion 133 of optimal values according to the amount of communication traffic between the controller 131 and the computing operation processor 138, the computational load on the computing operation processor 138, etc. When the amount of data for communication with the computing operation processor 138 is large, for example, and communication between the controller 131 and computing operation processor 138 is delayed, the controller 131 sends the parameter setting portion 133 a parameter value that increases (indicating a longer time) as the length of the delay increases. When the computational load on the computing operation processor 138 is high, the controller 131 sends the parameter setting portion 133 a parameter value that increases as the load increases. The controller 131 may determine the parameter value by considering both factors.

The command holding portion 132 holds information indicating the content of the command transmitted from the master device 110 and received via the I/F portion 137. For example, since the bits indicating the slave address in IIC communication are followed by a bit indicating the command content, the command holding portion 132 holds the value of the bit indicating the command content. In IIC communication, if the value of the bit indicating the command content is '0', it means that the master device 110 is sending a 'write' command; if the value of the bit is '1', it means that the master device 110 is sending a 'read' command.

Figure 4:
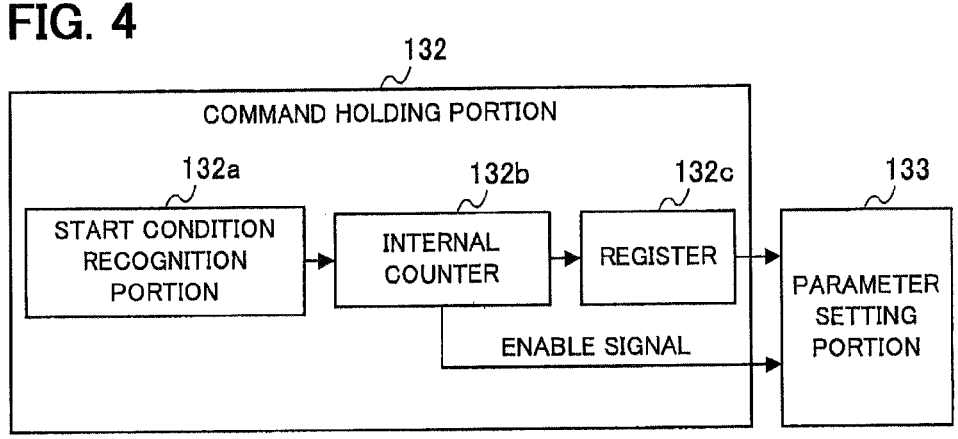
FIG. 4 is a block diagram schematically illustrating the configuration of the command holding portion in the first embodiment.

FIG. 4 is a block diagram schematically illustrating the configuration of the command holding portion 132.

The command holding portion 132 includes a start condition recognition portion 132a, an internal counter 132b, and a register 132c.

The start condition recognition portion 132a detects the start condition from the data transmitted by the master device 110 and received at the I/F portion 137.

When the start condition recognition portion 132a detects the start condition, the internal counter 132b identifies a bit located a prescribed number of bits from the start condition and stores the value of the bit, which indicates the command content, in the register 132c. For example, when the slave address has seven bits, the internal counter 132b counts the number of SOL clocks and identifies the bit indicating the command content as the bit that arrives eight clocks after the start condition. When the internal counter 132b updates the value of the register 132c, it outputs an enable signal to the parameter setting portion 133.

The register 132c stores the bit value (the value of the bit indicating the command content) transmitted from the internal counter 132b.

Returning to the description of FIG. 3, the parameter setting portion 133 changes the value of a parameter for detecting communication anomalies according to the information indicating the content of the command held in the command holding portion 132. When the parameter setting portion 133 receives an enable signal from the command holding portion 132 as shown in FIG. 4, it sets the parameter value in the anomaly detecting portion 134. In this embodiment, the value of the parameter for detecting communication anomalies is a threshold value applied to the time for which the SCL clock signal remains at the low level. The threshold value may correspond to, for example, a maximum time for which the SCL clock signal may remain at the low level. The command content held in the command holding portion 132 indicates 'read' or 'write', so the parameter setting portion 133 sets the parameter to one value when the command content held in the command holding portion 132 indicates 'read' and to a different value when the command content indicates 'write'. The set parameter value is supplied from the controller 131 and is preferably changeable as necessary.

The anomaly detecting portion 134 measures time in the processing of a command. For example, the anomaly detecting portion 134 measures the time for which the SCL clock signal is held at the low level. The anomaly detecting portion 134 compares the measured time with the maximum time corresponding to the parameter value set by the parameter setting portion 133. If the measured time exceeds the maximum time, the anomaly detecting portion 134 decides that a communication anomaly has occurred, and notifies the initializing portion 136 of the communication anomaly.

Figure 5:
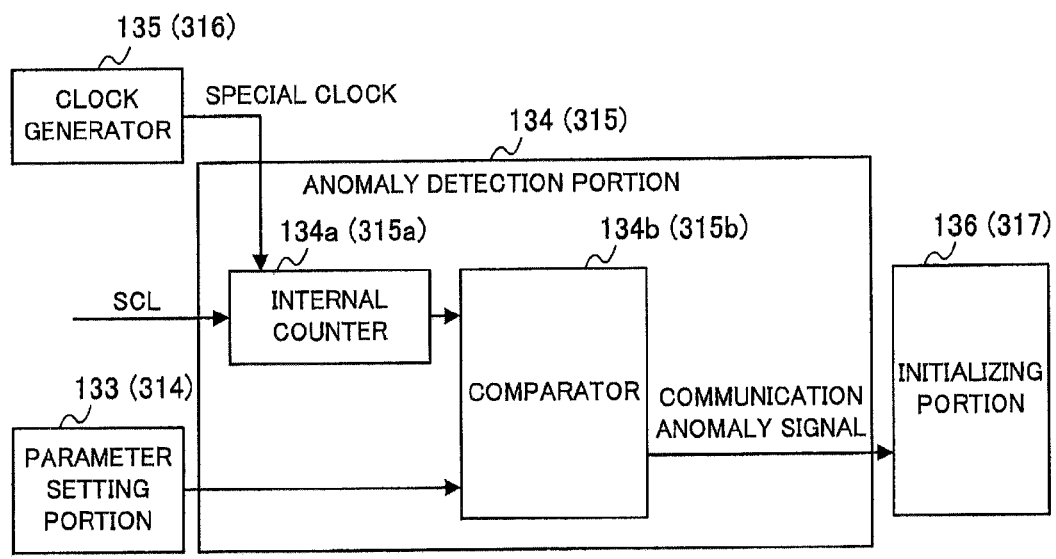
FIG. 5 is a block diagram schematically illustrating the configuration of the anomaly detecting portion in the first and third embodiments.

FIG. 5 is a block diagram schematically illustrating the configuration of the anomaly detecting portion 134. The anomaly detecting portion 134 includes an internal counter 134a and a comparator 134b. The reference characters in parentheses in FIG. 5 indicate components in the master device in the third embodiment.

The internal counter 134a latches the SCL state on a special clock having a frequency at least twice as high as the SCL frequency, and counts the time for which the SCL clock signal is held at the low level. The parameter value indicating the maximum time set in the parameter setting portion 133 is the count value reached by counting the special clock on which the internal counter 134a operates up to the maximum time.

When the count value in the internal counter 134a exceeds the parameter value set by the parameter setting portion 133, the comparator 134b issues a communication anomaly signal to notify the initializing portion 136 of a communication anomaly.

Returning to the description of FIG. 3, the clock generator 135 generates the special clock required by the anomaly detecting portion 134 to perform counting. The clock generator 135 supplies the special clock to the anomaly detecting portion 134.

When it receives a communication anomaly signal from the anomaly detecting portion 134, the initializing portion 136 outputs a reset signal to the controller 131.

The operation of the communication system 100 recited above will now be described.

Figure 6:
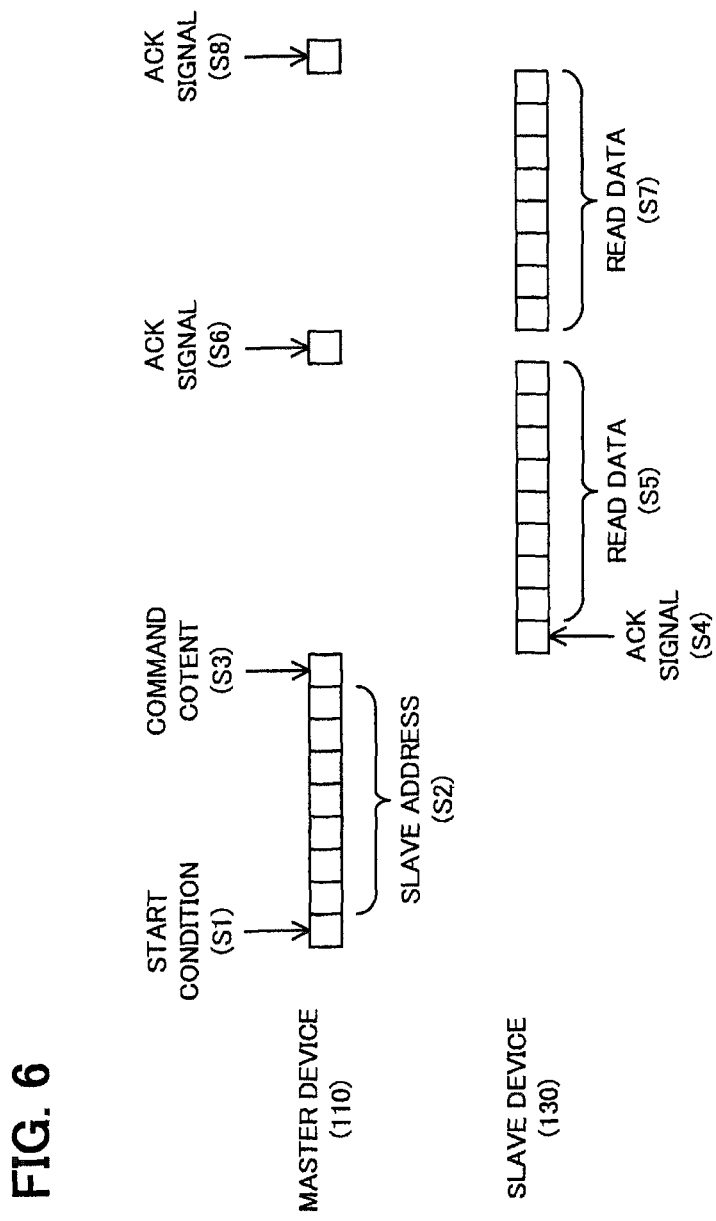
FIG. 6 is a schematic drawing illustrating a sequence in which the master device issues a read command and obtains data in the first embodiment.

FIG. 6 is a schematic drawing illustrating a sequence in which the master device 110 issues a read command and obtains data. FIG. 6 assumes the address of the slave device 130 to be seven bits wide.

In ITC communication, the control portion 111 in the master device 110 generates a unique state called a start condition via the I/F portion 112 (S1), and then transmits the address of the slave device it is communicating with and the bit indicating a 'read' command to the slave device 130 (S2 and S3).

In the slave device 130, the controller 131 recognizes the start condition via the I/F portion 137, and determines whether the slave address transmitted from the master device 110 matches its own address. If the result is that the address matches, the controller 131 transmits an ACK signal to the master device 110 via the I/F portion 137 in synchronization with the SCL clock signal (S4). The controller 131 also communicates with the computing operation processor 138 and transmits the result of a complex computational process performed using the computing operation processor 138 to the master device 110 (S5). During the time from transmission of the ACK signal (S4) until the computational process performed by the computing operation processor 138 has ended and the controller 131 is ready with the result of the computation, the controller 131 forcibly holds the SCL clock signal at the low level, indicating the busy state. The slave device 130 can thereby suspend data transmission for the period while the SCL clock signal is at the low level. Then, when the read data are ready, the controller 131 clears the busy state on the SCL line and transmits the read data (S5).

When it receives the read data, the control portion 111 in the master device 110 returns an ACK signal to the slave device 130 through the I/F portion 112 (S6). In the slave device 130, the controller 131 transmits the read data through the I/F portion 137 (S7). In response, the control portion 111 in the master device 110 returns an ACK signal to the slave device 130 via the I/F portion 112 (S8).

Figure 7:
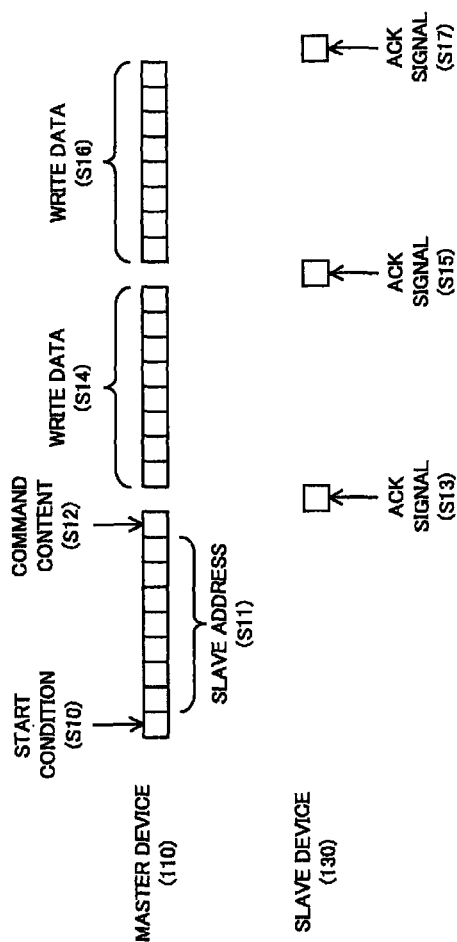
FIG. 7 is a schematic drawing illustrating a sequence in which the master device issues a write command and sends data in the first embodiment.

FIG. 7 is a schematic diagram illustrating a sequence in which the master device 110 issues a write command and transmits data in IIC communication.

The control portion 111 in the master device 110 generates a start condition via the I/F portion 112 (S10), and then transmits the address of the slave device it is communicating with and bits indicating a 'write' command to the slave device 130 (S11, S12).

In the slave device 130, the controller 131 recognizes the start condition via the I/F portion 137, and determines whether the slave address transmitted from the master device 110 matches its own address. If the result is that the address matches, the controller 131 transmits an ACK signal to the master device 110 via the I/F portion 137 in synchronization with the SCL clock signal (S13). After transmitting the ACK signal, while preparing to receive the next data, e.g., while transferring the data from a receiving buffer not shown in the drawings into RAM or another type of memory, the controller 131 forcibly holds the SCL clock signal at the low level. While the SCL clock signal remains at the low level, the master device 110 suspends data transmission.

When the master device 110 receives the ACK signal, the control portion 111 transmits write data to the slave device 130 via the I/F portion 112 in synchronization with rising edges of the SCL clock signal (S14).

In the slave device 130 that receives the write data, the controller 131 returns an ACK signal via the I/F portion 137 (S15). The controller 131 holds the SCL clock signal at the low level while preparing for data reception etc., and stops holding the SCL clock signal at the low level when the preparations for data reception etc. are completed. In the master device 110, the control portion 111 then transmits the write data to the slave device 130 via the I/F portion 112 (S16). The slave device 130 returns an ACK signal via the I/F portion 137 (S17).

Figure 8:
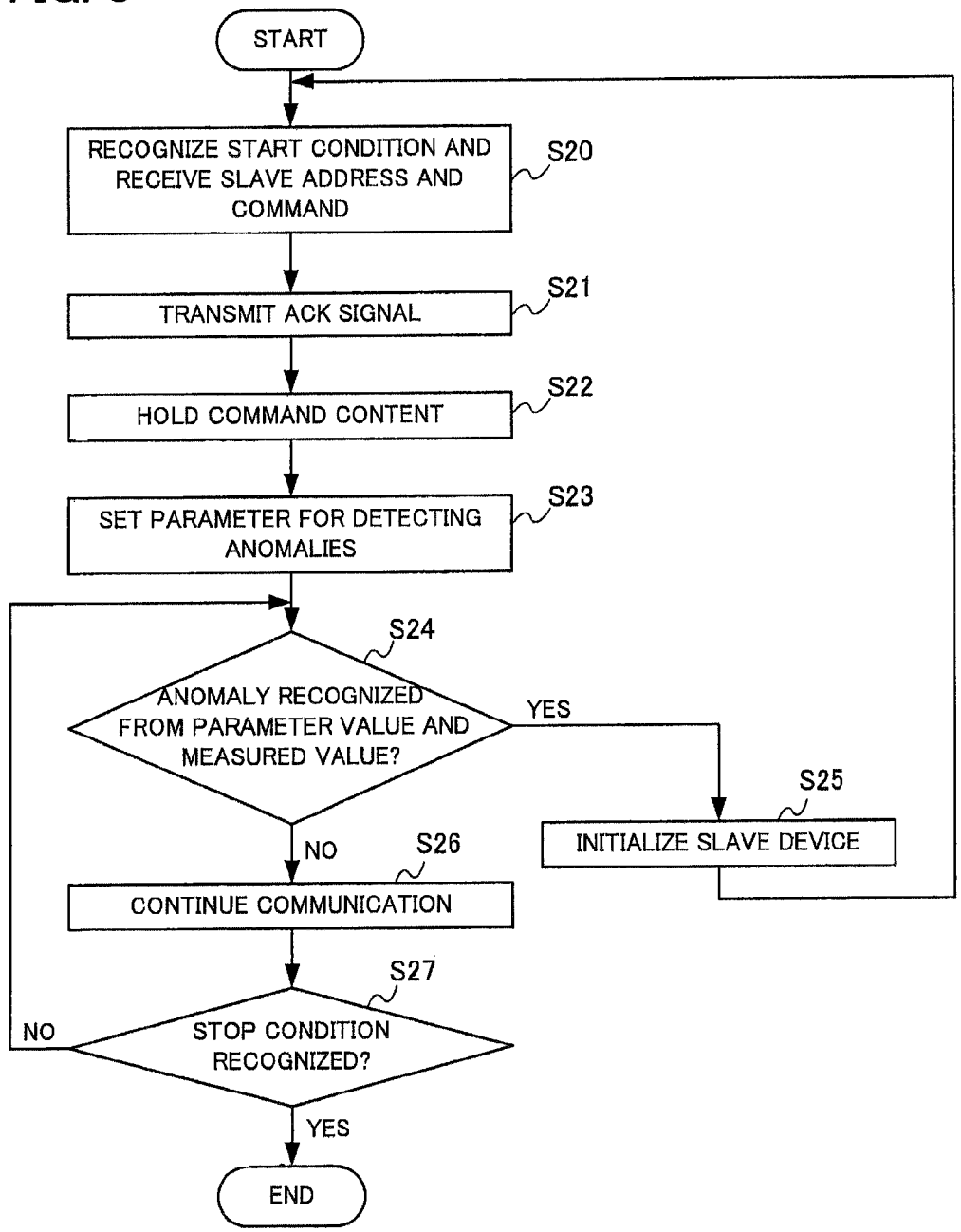
FIG. 8 is a flowchart illustrating processing in the slave device in the first embodiment.

FIG. 8 is a flowchart illustrating the processing in the slave device 130.

First, the controller 131 in the slave device 130 recognizes the start condition via the I/F portion 137, and receives the slave address and command transmitted from the master device 110 (S20).

If the received slave address matches its own address, the controller 131 transmits an ACK signal to the master device 110 via the I/F portion 137 in synchronization with the SCL clock signal (S21).

When the start condition recognition portion 132a in the command holding portion 132 shown in FIG. 4 recognizes the start condition generated by the master device 110, the internal counter 132b counts the number of SCL clocks and thereby identifies the command content bit, which arrives eight clocks after the start condition. The internal counter 132b stores the value of the identified bit in the register 132c (S23). For a read operation, the value of the command content bit is '1'; for a write operation, the value of the command content bit is '0'. When the internal counter 132b updates the value of the register 132c in the command holding portion 132, it also outputs an enable signal to the parameter setting portion 133.

The enable signal from the command holding portion 132 prompts the parameter setting portion 133 to test the command content bit held in the register 132c. The parameter setting portion 133 sets the parameter value in the anomaly detecting portion 134 for determining communication anomalies to a value corresponding to the maximum time for which the SCL clock signal may remain at the low level according to the command content indicated by the tested bit (in this case, 'read' or 'write') (S23). Here, if the value of the command content bit is '1', the parameter setting portion 133 sets, in the anomaly detecting portion 134, a parameter value corresponding to the maximum time for which the SCL clock signal may be held at the low level while read data are being processed. This parameter value is optimized for read operations. If the value of the command content bit is '0', the parameter setting portion 133 sets, in the anomaly detecting portion 134, a parameter value corresponding to the maximum time for which the SCL clock signal may be held at the low level while write data are being processed. This parameter value is optimized for write operations.

Next, the anomaly detecting portion 134 shown in FIG. 5 latches the SCL state on a special clock having a frequency at least twice as high as the SCL frequency, and counts the time while the SCL signal is held at the low level by the internal counter 134a. The comparator 134b checks whether or not the count value reached by the internal counter 134a exceeds the parameter value set by the parameter setting portion 133, corresponding to the maximum time for which the SCL clock signal may remain at the low level (S24). In the exemplary read operation shown in FIG. 6, the controller 131 forcibly holds the SCL clock signal at the low level after transmitting the ACK signal via the I/F portion 137 (S4). In the exemplary write operation shown in FIG. 7, the controller 131 forcibly holds the SCL clock signal at the low level after transmitting each ACK signal via the I/F portion 137 (S13, S15, S17). If the count value exceeds the parameter value (Yes in S24), the comparator 134b proceeds to the processing in step S25; if the count value does not exceed the parameter value (No in step S24), it proceeds to the processing in step S26.

In step S25, the comparator 134b decides that there is a communication anomaly and outputs a communication anomaly signal to the initializing portion 136. When the communication anomaly signal from the anomaly detecting portion 134 is asserted, the initializing portion 136 outputs a reset signal that initializes the controller 131.

If the command transmitted from the master device 110 was a read command, then when communication by the slave device 130 is initialized by the reset signal output from the initializing portion 136, the busy state is cleared, and the SCL line becomes available. Since the controller 131 in the slave device 130 is in its initial state, the processing for transmitting read data on the SDA line via the I/F portion 137 is not carried out. The SDA line is externally pulled up, so the value of the read data input to the master device 110 is '0xFF'.

If the master device 110 and slave device 130 are programmed so as not to exchange data with a value of '0xFF', then when consecutive read data having a value of '0xFF' are input, the master device 110 recognizes that communication has been initialized in the slave device 130, generates another start condition, outputs the slave address and command content, and thereby resumes communication with the slave device 130.

The number of consecutive inputs of read data having a value of '0xFF' that causes communication to be recognized as having been initialized in the slave device 130 is set in an internal register (not shown) provided in the master device 110. The control portion 111 in the master device 110 compares the value of the internal register with, for example, the value reached by a counter that counts consecutive inputs of read data having a value of '0xFF' to determine whether communication has been initialized in the slave device 130 or not.

If the command transmitted from the master device 110 was a write command, then when communication by the slave device 130 is initialized by the reset signal output from the initializing portion 136, the controller 131, being in the initial state, cannot return an ACK signal for write data transmitted from the master device 110. Accordingly, if an ACK signal is not returned from the slave device 130 for a prescribed period of time, the master device 110 recognizes that communication has been initialized in the slave device 130, generates another start condition, outputs the slave address and command content, and resumes communication with the slave device 130.

In step S26, the controller 131 continues communication with the master device 110.

Then the controller 131 checks the I/F portion 137 to see whether or not it has recognized a stop condition generated by the master device 110 (S27). If the stop condition is recognized (Yes in S27), the controller 131 terminates the flow of processing; if the stop condition is not recognized (No in S27), the processing returns to step S24.

Thus the content of the processing in the slave device 130 changes depending on whether the command is a 'read' or 'write' command, and the time for which the controller 131 forcibly holds the SCL clock signal at the low level changes accordingly. A read operation typically takes longer than a write operation. This is because in the preparation of read data, for example, data exchanges between the controller 131 and computing operation processor 138 may take time, computational processes in the computing operation processor 138 may be required, and computational processes in the controller 131 may be required. Accordingly, the time for which the controller 131 holds the SCL clock signal at the low level is longer in a read operation than in a write operation.

Therefore, if the parameter values for detecting anomalies in read and write operations are set to the same value, and if the parameter value is small, false anomalies may be detected during normal read processing, causing the processing to be reset. If the parameter value is large, however, then anomaly detection will take too long, and the processing speed of the communication system 100 will be slowed.

In the slave device 130 in the first embodiment, the anomaly detection parameter is set to an optimal value according to the content of the command from the master device 110, so anomalies can be detected as appropriate for the command content, 'read' or 'write'. Accordingly, it is possible to prevent false detection of anomalies and the resultant resetting during normal operation. It is also possible to prevent processing in the communication system 100 from being slowed down by excessive time taken for anomaly detection.

In the first embodiment, the computing operation processor 138 is connected to the controller 131, but this configuration is not limiting. The computing operation processor 138 may be located within the controller 131, for example. Although the anomaly detecting portion 134 includes an internal counter 134a for detecting the time for which the SCL clock signal is held at the low level, this configuration is also not limiting; any configuration that enables the time for which the SCL clock signal is held at the low level to be detected may be used.

In the first embodiment, the master device 110 recognizes that communication is initialized in the slave device 130 when data having a value of '0xFF' are consecutively input in a read operation and when an ACK signal is not returned within a prescribed time period in a write operation, but the invention is not limited to this exemplary scheme. For example, a report line with which the slave device 130 reports initialization of communication to the master device 110 may be added. Reporting initialization by use of such a report line enables the master device 110 to be notified of initialization more quickly.

Second Embodiment

The second embodiment will now be described. The communication system 200 according to the second embodiment includes a master device 110 and a slave device 230 as shown in FIG. 1. The communication system 200 according to the second embodiment differs from the communication system 100 according to the first embodiment in regard to the slave device 230. When the command is a 'read' command, the slave device 230 in the second embodiment compares the time from reception of the command until transmission of the read data with a time corresponding to a parameter value set for read operations; when the command content is a 'write' command, it compares the time from reception of the command until reception of the write data with a time corresponding to a parameter value set for write operations.

Figure 9:
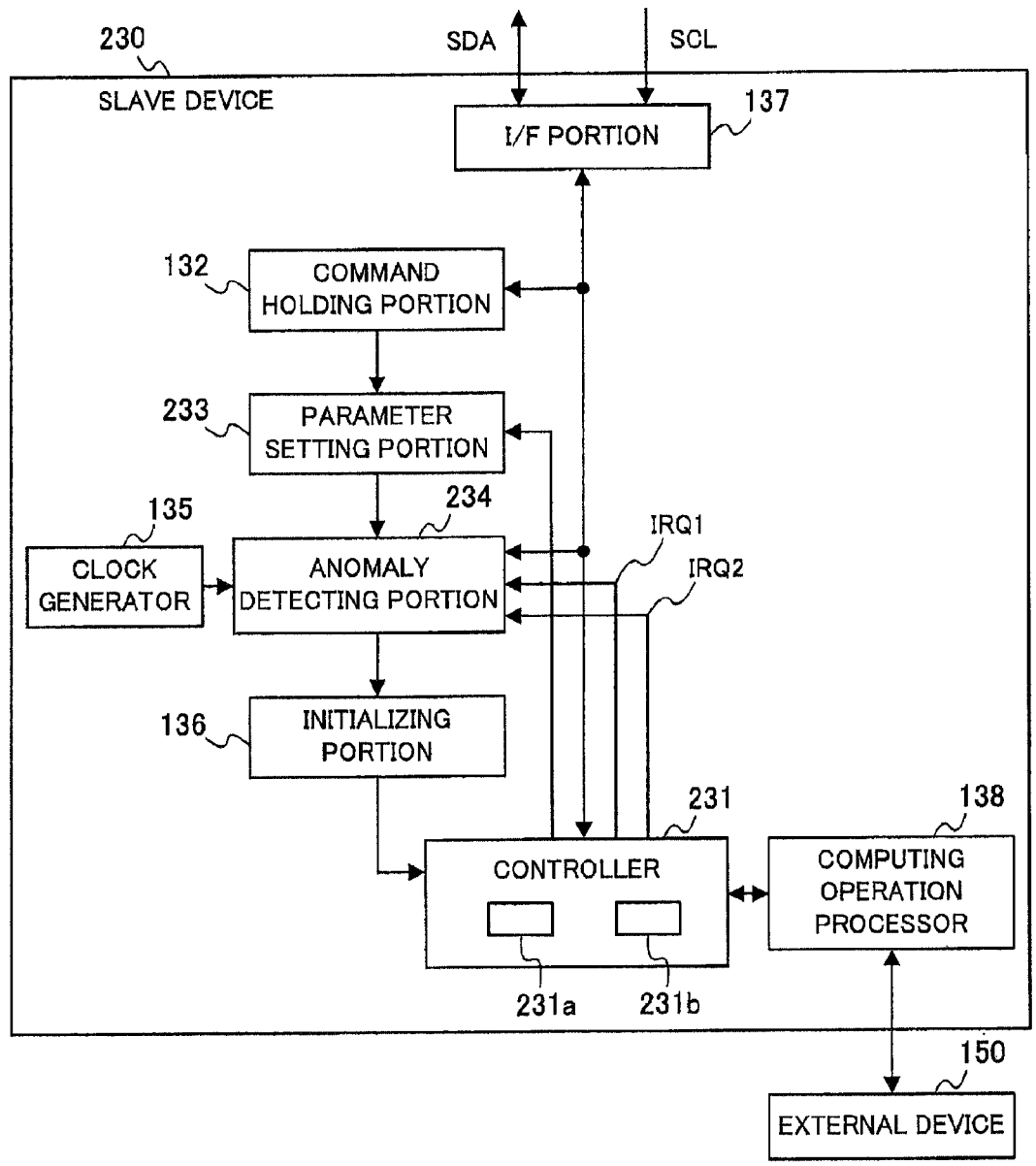
FIG. 9 is a block diagram schematically illustrating the configuration of the slave device in the second embodiment.

FIG. 9 is a block diagram schematically illustrating the configuration of the slave device 230. The slave device 230 includes a controller 231, a command holding portion 132, a parameter setting portion 233, an anomaly detecting portion 234, a clock generator 135, an initializing portion 136, an I/F portion 137, and a computing operation processor 138. The slave device 230 in the second embodiment differs from the slave device 130 in the first embodiment in regard to the processing in the controller 231, the parameter setting portion 233 and anomaly detecting portion 234. The slave device 230 in the second embodiment also includes newly added signal lines IRQ1 and IRQ2 that interconnect the controller 231 and anomaly detecting portion 234.

The controller 231 controls communication in accordance with the IIC protocol.

When the controller 231 receives a reset signal from the initializing portion 136, it initializes (resets) the communication process and returns to the state in which it waits for a command from the master device 110.

Furthermore, the controller 231 supplies the parameter setting portion 233 with a parameter value corresponding to the content of the command from the master device 110. For example, the controller 231 notifies the parameter setting portion 233 of optimal values in a 'read' or 'write' operation according to the amount of communication traffic between the controller 231 and the computing operation processor 138, the computational load on the computing operation processor 138, etc. In this embodiment, the parameter value when the command is 'read' is a threshold value applied to the time from reception of the command from the master device 110 until transmission of the read data corresponding to the command. The threshold value may be set to a value corresponding to the maximum time from reception of the command from the master device 110 until transmission of the read data corresponding to the command. The parameter value when the command is 'write' is a threshold value applied to the time from reception of the command from the master device 110 until reception of the write data corresponding to the command. The threshold value may be set to a value corresponding to the maximum time from reception of the command from the master device 110 until reception of the write data corresponding to the command.

The controller 231 recognizes the start condition from the master device 110 via the I/F portion 137, and when it receives its own slave address, it sends a command reception notification indicating reception of the command to the anomaly detecting portion 234. The controller 231 performs command reception notification by, for example, asserting the signal on the IRQ1 line.

When the controller 231 has received a 'read' command from the master device 110 via the I/F portion 137 and transmitted the requested read data, it sends the anomaly detecting portion 234 a read data transmission notification indicating that it has transmitted read data. For example, the controller 231 stores the read data in a transmitting buffer 231a in the controller 231 and performs a process for transmitting the read data to the master device 110 via the I/F portion 137; when the transmitting buffer 231a becomes empty (when the transmission ends), the controller 231 asserts the signal on the IRQ2 line, thereby performing a read data transmission notification.

When the controller 231 has received a 'write' command from the master device 110 via the I/F portion 137 and has received the write data corresponding to the command, it sends the anomaly detecting portion 234 a write data reception notification indicating that it has received the write data. The controller 231, for example, stores the write data obtained via the I/F portion 137 in a receiving buffer 231b in the controller 231, and supplies the write data to the computing operation processor 138, or to a memory or other device not shown in the drawings; when the receiving buffer 231b becomes empty (when reception ends), the controller 231 asserts the signal on the IRQ2 line, thereby performing a write data reception notification.

The parameter setting portion 233 changes the parameter value for detecting communication anomalies according to the information indicating the command content held in the command holding portion 132. As shown in FIG. 4, when the parameter setting portion 233 receives an enable signal from the command holding portion 132, it sets a parameter value in the anomaly detecting portion 234. In this embodiment, the parameter value for detecting a communication anomaly is a threshold value applied to the time until completion of a transmitting or receiving operation. The threshold value may be set to a value corresponding to the maximum completion time of the transmitting operation or receiving operation. Here, the command content information held in the command holding portion 132 indicates 'read' or 'write', so the parameter setting portion 233 sets one parameter value when the information held in the command holding portion 132 indicates 'read' and another parameter value when it indicates 'write'. The set parameter value is supplied from the controller 231, and is preferably changeable as necessary.

The anomaly detecting portion 234 measures time during the processing of a command. For example, the anomaly detecting portion 234 measures the time from reception of a command reception notification from the controller 231. The anomaly detecting portion 234 compares the measured time with the maximum time corresponding to the parameter value set by the parameter setting portion 233. If the measured time exceeds the maximum time, the anomaly detecting portion 234 decides that a communication anomaly has occurred, and notifies the initializing portion 136 of the communication anomaly.

When the anomaly detecting portion 234 receives a read data transmission notification or a write data reception notification from the controller 231, it terminates time measurement.

Figure 10:
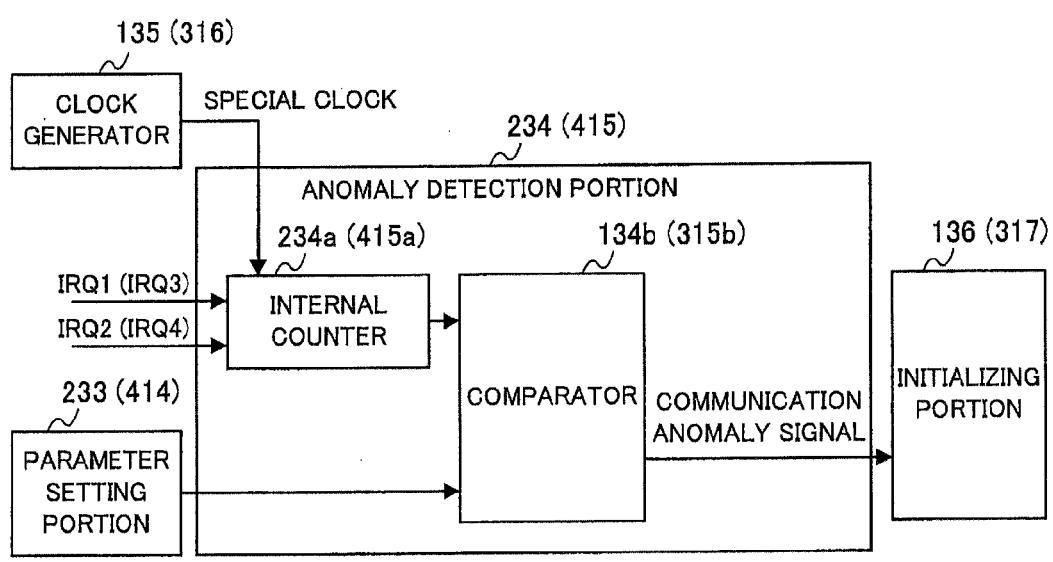
FIG. 10 is a block diagram schematically illustrating the configuration of the anomaly detecting portion in the second and fourth embodiment.

FIG. 10 is a block diagram schematically illustrating the configuration of the anomaly detecting portion 234. The anomaly detecting portion 234 includes an internal counter 234a and a comparator 234b. The reference characters in parentheses in FIG. 10 indicate components in the master device in the fourth embodiment.

Using a special clock, the internal counter 234a counts time from assertion of the IRQ1 signal. The parameter value indicating the maximum time set by the parameter setting portion 233 is the count value reached by counting the special clock on which the internal counter 234a operates up to the maximum time. When the signal on the IRQ2 line is asserted, the internal counter 234a stops counting.

When the count value in the internal counter 234a exceeds the parameter value set by the parameter setting portion 233, the comparator 234b sends a communication anomaly signal reporting a communication anomaly to the initializing portion 136.

Figure 11:
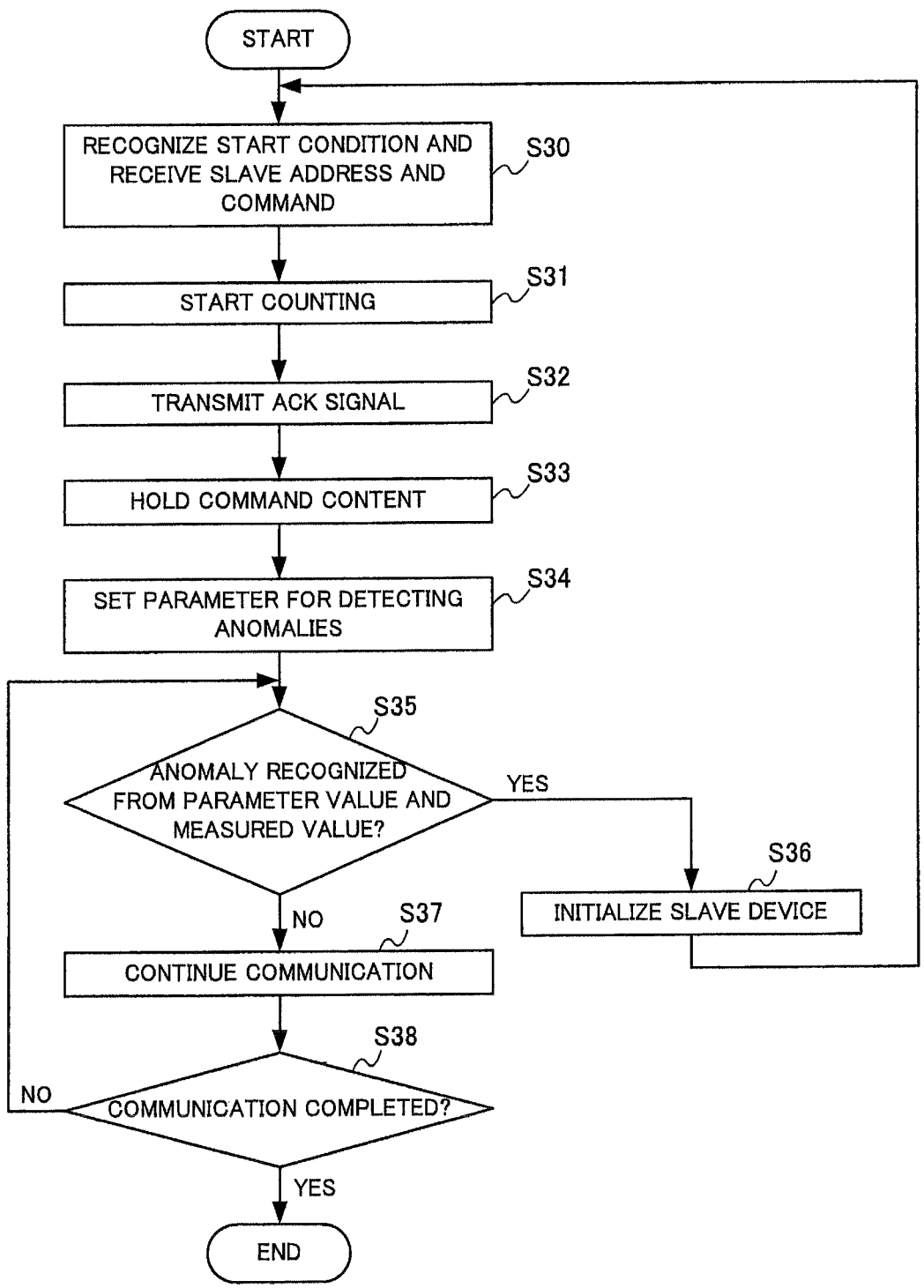
FIG. 11 is a flowchart illustrating processing in the slave device in the second embodiment.

FIG. 11 is a flowchart illustrating the processing in the slave device 230.

First, the controller 231 in the slave device 230 recognizes a start condition via the I/F portion 137 and receives the slave address and command content transmitted from the master device 110 (S30).

Here, when the controller 231 recognizes the start condition via the I/F portion 137 and decides that the received slave address is its own, it asserts the IRQ1 signal. The internal counter 234a in the anomaly detecting portion 234 detects the assertion of IRQ1 and starts counting (S31).

If the received slave address matches its own address, the controller 231 transmits an ACK signal to the master device 110 via the I/F portion 137 in synchronization with the SCL clock signal (S32).

When the start condition generated by the master device 110 is recognized by the start condition recognition portion 132a in the command holding portion 132 shown in FIG. 4, the internal counter 132b counts the number of SCL clocks, thereby identifying the command content bit, which arrives eight clocks after the start condition. Then the internal counter 132b stores the value of the identified bit in the register 132c (S33). When the internal counter 132b updates the value of the register in the command holding portion 132, it also outputs an enable signal to the parameter setting portion 233.

The enable signal from the command holding portion 132 prompts the parameter setting portion 233 to test the command content bit held in the register 123c. According to the bit content, the parameter setting portion 233 sets in the anomaly detecting portion 234 a parameter value corresponding to the maximum processing time for deciding that a communication anomaly has occurred (S34). Here, if the value of the command content bit is '1', the parameter setting portion 233 sets a parameter value that corresponds to the maximum processing time and is optimized for read operations in the anomaly detecting portion 234. If the value of the command content bit is '0', the parameter setting portion 233 sets a parameter value that corresponds to the maximum processing time and is optimized for write operations in the anomaly detecting portion 234.

Next, the anomaly detecting portion 234 shown in FIG. 10 latches the state of the SCL clock signal on a special clock having a frequency at least twice as high as the SCL frequency and counts the time from when the assertion of IRQ1 is detected by the internal counter 234a. The comparator 234b checks whether or not the count value reached by the internal counter 234a exceeds the parameter value set by the parameter setting portion 233, indicating the maximum processing time (S35). If the count value exceeds the parameter value (Yes in S35), the comparator 234b proceeds to the processing in step S36; if the count value does not exceeds the parameter value (No in S35), it proceeds to the processing in step S37.

In step S36, the comparator 234b decides that there is a communication anomaly and outputs a communication anomaly signal to the initializing portion 136. When the communication anomaly signal from the anomaly detecting portion 234 is asserted, the initializing portion 136 outputs a reset signal to initialize the controller 231. This causes the controller 231 to clear the busy state and return to the state in which it waits for a command from the master device 110.

In step S37, the controller 231 continues the process of communicating with the master device 110.

Then the controller 231 checks whether or not communication with the master device 110 has been completed via the I/F portion 137 (S38). For example, when the command from the master device 110 is a 'read' command, the controller 231 decides that communication with the master device 110 has been completed when the read data stored in the transmitting buffer 231a have been transmitted and the transmitting buffer 231a is empty. When the command from the master device 110 is a 'write' command, the controller 231 decides that communication with the master device 110 has been completed when the write data stored in the receiving buffer 231b have been processed and the receiving buffer 231b is empty. When the controller 231 decides that communication has been completed (Yes in S38), it ends the flow of processing; when it decides that communication has not been completed yet (No in S38), the processing returns to step S35. When the controller 231 decides that communication has been completed (Yes in S38), it asserts the IRQ2 signal. The internal counter 234a in the anomaly detecting portion 234 stops counting when it detects the IRQ2 assertion.

As described above, in the communication system 200 according to the second embodiment, the processing time from assertion of the command reception interrupt when a command transmitted from the master device 110 is received until assertion of the transmit or receive buffer empty interrupt when the transmitting or receiving buffer becomes empty is counted and the count value is compared with the parameter value, so anomalies can be detected with enhanced accuracy.

In the communication system 200 according to the second embodiment, the controller 231 is connected to the computing operation processor 138, but this configuration is not a limitation; the computing operation processor 138 may be located within the controller 231. Furthermore, the anomaly detecting portion 234 includes an internal counter 234a for measuring the time from IRQ1 to IRQ2, but this configuration is also not limiting; any configuration that enables the time from IRQ1 to IRQ2 to be measured may be used.

In the second embodiment, when the command content indicates 'read', the parameter value set by the parameter setting portion 233 is a value corresponding to the maximum time from reception of the command until the completion of read data transmission, but the invention is not limited to this scheme. For example, the parameter value set by the parameter setting portion 233 may correspond to the maximum time from reception of the command until the start of read data transmission. In that case, the controller 231, for example, stores the read data in the transmitting buffer 231a in the controller 231, and when it starts to transmit the read data to the master device 110 via the I/F portion 137, it asserts the IRQ2 signal, thereby performing the read data transmission notification.

In the second embodiment, when the command content indicates 'write', the parameter value set by the parameter setting portion 233 is a value corresponding to the maximum time from reception of the command until the completion of write data reception, but the invention is not limited to this scheme. The parameter value set by the parameter setting portion 233 may be a value corresponding to the maximum time from reception of the command until the start of write data reception. In that case, the controller 231 asserts the IRQ2 signal, thereby performing the write data reception notification, when it starts storing the write data in the receiving buffer 231b in the controller 231, for example.

Furthermore, in the second embodiment, if the command content is 'write', the controller 231 stores the write data obtained via the I/F portion 137 in the receiving buffer 231b in the controller 231 and supplies the write data to the computing operation processor 138, or to a memory or other device not shown in the drawings, and when the receiving buffer 231b becomes empty, it asserts the IRQ2 signal, thereby performing write data reception notification, but instead, the receiving buffer 231b may assert the IRQ2 signal and perform write data reception notification when, for example, the storing of the write data in the receiving buffer 231b is completed.

Third Embodiment

The third embodiment will now be described. The communication system 300 according to the third embodiment includes a master device 310 and a slave device 130 as shown in FIG. 1. The communication system 300 according to the third embodiment differs from the communication system 100 in the first embodiment in regard to the master device 310. In the third embodiment, an initialization process is also carried out in the master device 310.

Figure 12:
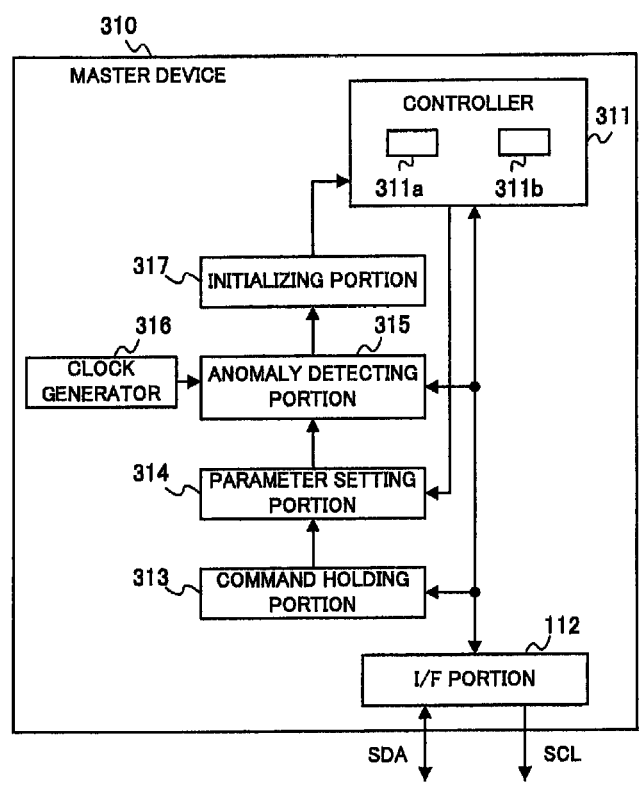
FIG. 12 is a block diagram schematically illustrating the configuration of the master device in the third embodiment.

FIG. 12 is a block diagram schematically illustrating the configuration of the master device 310. The master device 310 includes a control portion 311, an I/F portion 112, a command holding portion 313, a parameter setting portion 314, an anomaly detecting portion 315, a clock generator 316, and an initializing portion 317. The master device 310 in the third embodiment differs from the master device 110 in the first embodiment in regard to the processes carried out by the control portion 311, and in that the command holding portion 313, parameter setting portion 314, anomaly detecting portion 315, clock generator 316, and initializing portion 317 are additionally provided.

The control portion 311 controls communication in accordance with the IIC protocol.

When the control portion 311 receives a reset signal from the initializing portion 317, the control portion 311 initializes (resets) the communication process and then restarts the reset communication process.

In addition, during communication with the slave device 130 in accordance with the IIC protocol, if the slave device 130 initializes (resets) the communication, the control portion 311 performs processing to restart the initialized communication.

Furthermore, the control portion 311 supplies the parameter setting portion 314 with a parameter value corresponding to the content of a command to be transmitted to the slave device 130. For example, the control portion 311 supplies the parameter setting portion 314 with a value optimized for a 'read' or 'write' operation based on the amount of communication traffic between the control portion 311 and the slave device 130 or the amount of communication traffic between the control portion 311 and other slave devices 130 if multiple slave devices 130 are connected to the control portion 311, although only a single slave device 130 is shown in FIG. 1. When the amount of data in communication with the control portion 311 and the slave device 130 or other slave devices 130 is large and communication between them is delayed, the control portion 311 sends the parameter setting portion 314 a parameter value that increases as the length of delay increases.

The control portion 311 also sends the command holding portion 313 command content to be transmitted to the slave device 130 via the I/F portion 112.

The command holding portion 313 includes a register for holding a bit of information indicating the command content, either 'read' or 'write', sent from the control portion 311. When the command holding portion 313 updates the bit value held in the register, it sends an enable signal to the parameter setting portion 314.

The parameter setting portion 314 changes the parameter value for detecting communication anomalies according to the information indicating the command content held in the command holding portion 313. Here, when the parameter setting portion 314 receives the enable signal from the command holding portion 313, the parameter setting portion 314 sets a parameter value in the anomaly detecting portion 315. In this embodiment, the parameter value for detecting communication anomalies is a threshold value applied to the time for which the SCL clock signal remains at the low level. The threshold value may be set to a value corresponding to the time for which the SCL clock signal may remain at the low level. The command content held in the command holding portion 313 indicates 'read' or 'write', so the parameter setting portion 314 sets the parameter to one value when the command content held in the command holding portion 313 indicates 'read' and to another value when the command content indicates 'write'. The set parameter value is supplied from the control portion 311 and is preferably changeable as necessary.

The anomaly detecting portion 315 measures time in the processing of a command. The anomaly detecting portion 315, for example, measures the time for which the SCL clock signal is held at the low level. The anomaly detecting portion 315 compares the measured time with the maximum time corresponding to the parameter value set by the parameter setting portion 314. If the measured time exceeds the maximum time, the anomaly detecting portion 315 decides that a communication anomaly has occurred and notifies the initializing portion 317 of the communication anomaly. As shown in FIG. 5, the anomaly detecting portion 315 includes an internal counter 315a and a comparator 315b.

The internal counter 315a latches the SCL state on a special clock having a frequency at least twice as high as the SCL frequency, and counts the time for which the SCL clock signal is held at the low level. The parameter value indicating the maximum time set in the parameter setting portion 314 is the count value reached when the special clock on which the internal counter 315a operates is counted up to the maximum time.

When the count value in the internal counter 315a exceeds the parameter value set by the parameter setting portion 314, the comparator 315b issues a communication anomaly signal to notify the initializing portion 317 of a communication anomaly.

Returning to the description of FIG. 12, the clock generator 316 generates the special clock required by the anomaly detecting portion 315 to perform counting. The clock generator 316 supplies the special clock to the anomaly detecting portion 315.

When it receives a communication anomaly signal from the anomaly detecting portion 315, the initializing portion 317 outputs a reset signal to the control portion 311.

Figure 13:
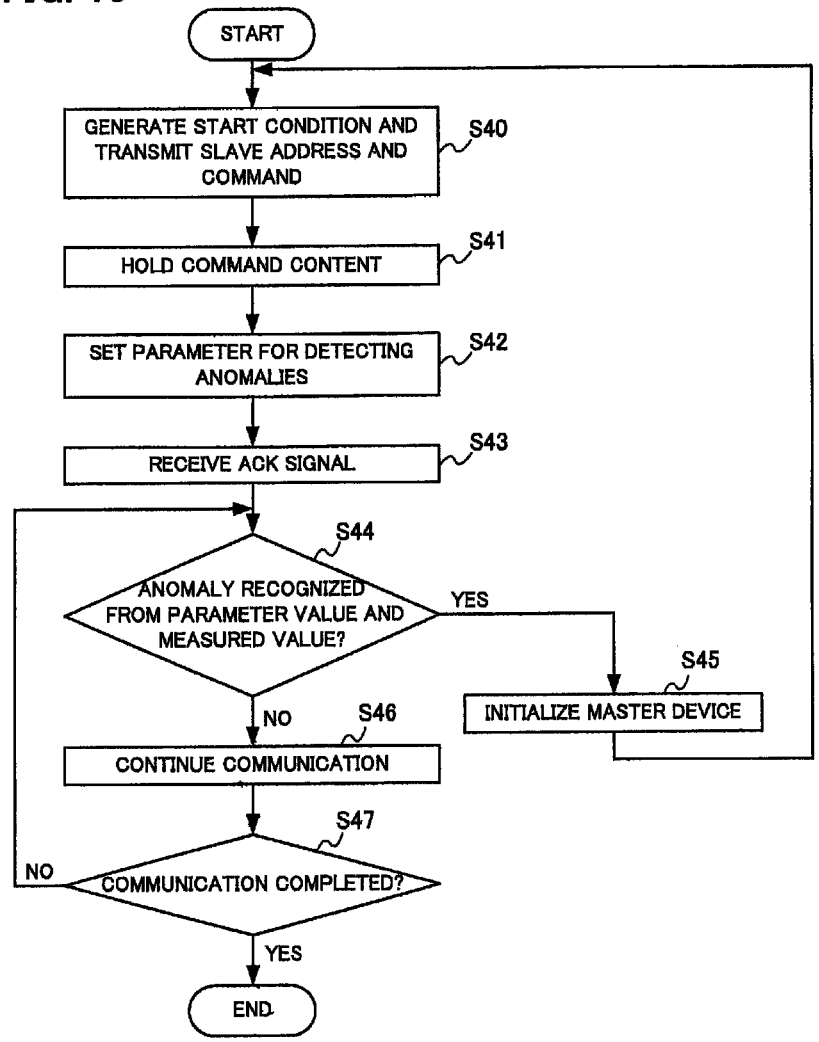
FIG. 13 is a flowchart illustrating processing in the master device in the third embodiment.

FIG. 13 is a flowchart illustrating the processing in the master device 310 in the third embodiment.

The control portion 311 generates a start condition via the I/F portion 112, and then transmits the slave address and command content (S40).

At this time, the control portion 311 also supplies the command holding portion 313 with the command content to be transmitted. The command holding portion 313 updates the register value so that it indicates the supplied command content (S41). For a read operation, the register value is '1'; for a write operation, the register value is '0'. Then the command holding portion 313 outputs an enable signal to the parameter setting portion 314.

The enable signal from the command holding portion 313 prompts the parameter setting portion 314 to test the command content bit held in the register. The parameter setting portion 314 sets the parameter value in the anomaly detecting portion 315 for determining communication anomalies to a value corresponding to the maximum time for which the SCL clock signal may remain at the low level according to the command content indicated by the tested bit (S42). Here, if the value of the command content bit is '1', the parameter setting portion 314 sets, in the anomaly detecting portion 315, a parameter value corresponding to the maximum time for which the SCL clock signal may be held at the low level while read data are being processed. This parameter value is optimized for read operations. If the value of the command content bit is '0', the parameter setting portion 314 sets, in the anomaly detecting portion 315, a parameter value corresponding to the maximum time for which the SCL clock signal may be held at the low level while write data are being processed. This parameter value is optimized for write operations.

Next, the control portion 311 performs processing to receive an ACK signal from the slave device 130 via the I/F portion 112 (S43). When it receives the ACK signal, the control portion 311 performs processing corresponding to the command content it transmitted to the slave device 130 in step S40. If the command content transmitted in step S40 indicates 'read', for example, the control portion 311 stores the read data received via the I/F portion 112 in the transmitting buffer 311a. Then when reception of the read data has been completed, the control portion 311 performs processing to transmit an ACK signal to the slave device 130 via the I/F portion 112. If the command content transmitted in step S40 indicates 'write', the control portion 311 performs processing to transmit the write data stored in the receiving buffer 311b in the control portion 311 via the I/F portion 112.

Next, the anomaly detecting portion 315 shown in FIG. 5 latches the state of the SCL clock signal on the special clock having a frequency at least twice as high as the SCL clock frequency, and counts the time for which the SCL clock signal remains at the low level. The comparator 315b checks whether or not the count value reached by the internal counter 315a exceeds the parameter value set by the parameter setting portion 314, which indicates the maximum time for which the SCL clock signal may remain at the low level (S44). If the count value exceeds the parameter value indicating the maximum time for which the SCL clock signal may remain at the low level (Yes in S44), the comparator 315b proceeds to the processing in step S45; if the count value does not exceed the parameter value indicating the maximum time for which the SCL clock signal may remain at the low level (No in S44), it proceeds to the processing in step S46.

In step S45, the comparator 315b decides that a communication anomaly has occurred and outputs a communication anomaly signal to the initializing portion 317. When the communication anomaly signal from the anomaly detecting portion 315 is asserted, the initializing portion 317 outputs a reset signal to initialize the control portion 311. The control portion 311 is thereby initialized and starts IIC communication anew.

In step S46, the control portion 311 continues performing the processing for communicating with the slave device 130.

The control portion 311 then determines whether communication with the slave device 130 has been completed or not (S47). If communication has been completed (Yes in S47), the control portion 311 generates a stop condition via the I/F portion 112 and terminates the flow of processing. If communication has not been completed yet (No in S47), the control portion 311 returns to the processing in step S44.

As described above, according to the third embodiment, each of the master device 310 and slave device 130 sets a parameter value for detecting anomalies to an optimal value according to command content, and when an anomaly is detected by use of the value, each performs initialization, so no additional signal line is needed for initialization notification between the master device 310 and slave device 130.

The anomaly detecting portions 134, 315 in the third embodiment include internal counters 134a, 315a for detecting the time for which the SCL clock signal is held at the low level, but this configuration is not limiting; any configuration that enables the time for which the SCL clock signal is held at the low level to be detected may be used.

The slave device 230 described in the second embodiment may be connected to the master device 310 described in the third embodiment.

Fourth Embodiment

The fourth embodiment will now be described. As shown in FIG. 1, a communication system 400 according to the fourth embodiment includes a master device 410 and a slave device 230. The communication system 400 according to the fourth embodiment differs from the communication system 200 in the second embodiment in regard to the master device 410. In the fourth embodiment, in a read operation, the master device 410 compares the time from transmission of a read command until reception of the read data with the time indicated by the parameter set for read operations; in a write operation, the master device 410 compares the time from transmission of a write command until transmission of the write data with the time indicated by the parameter set for write operation.

Figure 14:
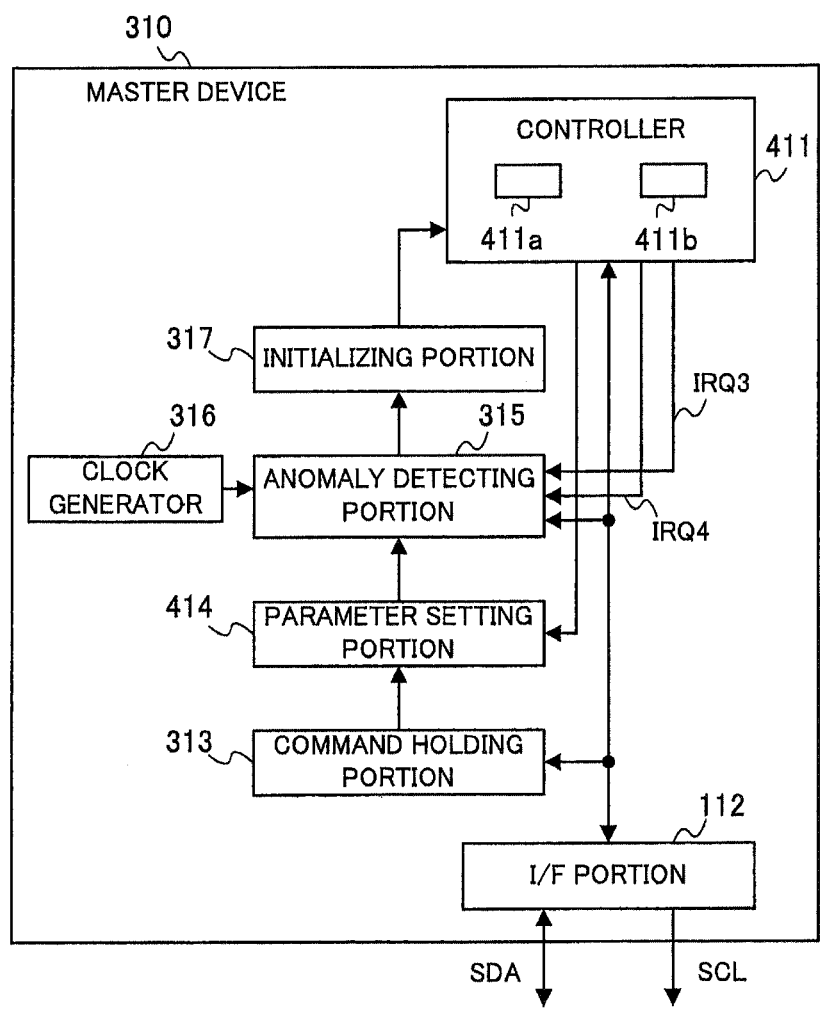
FIG. 14 is a block diagram schematically illustrating the configuration of the master device in the fourth embodiment.

FIG. 14 is a block diagram schematically illustrating the configuration of the master device 410.

The master device 410 includes a control portion 411, an I/F portion 112, a command holding portion 313, a parameter setting portion 414, an anomaly detecting portion 415, a clock generator 316, and an initializing portion 317. The master device 410 in the fourth embodiment differs from the master device 310 in the third embodiment in regard to the control portion 411, parameter setting portion 414, and anomaly detecting portion 415. The master device 410 in the fourth embodiment also includes newly added signal lines IRQ3 and IRQ4 that interconnect the control portion 411 and anomaly detecting portion 415.

The control portion 411 controls communication in accordance with the IIC protocol.

When it receives a reset signal from the initializing portion 317, the control portion 411 also initializes (resets) the communication process and then resumes the reset communication process.

Furthermore, when the slave device 230 initializes (resets) communication while the master device 410 is communicating with the slave device 230 in accordance with the IIC protocol, the control portion 411 performs processing for resuming the initialized communication. The control portion 411 also supplies the command holding portion 313 with command content to be transmitted to the slave device 230 via the I/F portion 112.

The control portion 411 also notifies the parameter setting portion 414 of the parameter value corresponding to the content of a command transmitted to the slave device 230. In this embodiment, the parameter value for a command indicating 'read' is a threshold value applied to the time from transmission of the command to the slave device 230 until reception of the read data corresponding to the command. The threshold value may be a value corresponding to the maximum time from transmission of the command to the slave device 230 until reception of the read data corresponding to the command. The parameter value for a command indicating 'write' is a threshold value applied to the time from transmission of the command to the slave device 230 until transmission of the write data corresponding to the command. The threshold value may be a value corresponding to the maximum time from transmission of the command to the slave device 230 until transmission of the read data corresponding to the command.

When the control portion 411 generates a start condition via the I/F portion 112, the control portion 411 sends the anomaly detecting portion 415 a command transmission notification indicating that a command has been transmitted. For example, the control portion 411 performs the command transmission notification by asserting the signal on the IRQ3 line.

When it transmits a 'read' command to the slave device 230 via the I/F portion 112 and receives the read data corresponding to the command, the control portion 411 sends a read data reception notification indicating that it has received the read data to the anomaly detecting portion 415. For example, the control portion 411 asserts the IRQ4 signal, thereby performing the read data reception notification, when it starts to store the read data received via the I/F portion 112 in its receiving buffer 411b (when it starts data reception).

When it transmits a 'write' command to the slave device 230 via the I/F portion 112 and transmits the write data corresponding to the command, the control portion 411 sends the anomaly detecting portion 415 a write data transmission notification indicating that it has transmitted the write data. For example, the control portion 411 asserts the IRQ4 signal, thereby performing the write data transmission notification, when it stores write data in the transmitting buffer 411a in the control portion 411 and starts the process that transmits the write data to the master device 110 (when transmission starts).

When the control portion 411 generates a start condition via the I/F portion 112, the control portion 411 sends the anomaly detecting portion 415 a command transmission notification indicating that a command has been transmitted. For example, the control portion 411 performs the command transmission notification by asserting the signal on the IRQ3 line.

When it transmits a 'read' command to the slave device 230 via the I/F portion 112 and receives the read data corresponding to the command, the control portion 411 sends a read data reception notification indicating that it has received the read data to the anomaly detecting portion 415. For example, the control portion 411 asserts the IRQ4 signal, thereby performing the read data reception notification, when it starts to store the read data received via the I/F portion 112 in its receiving buffer 411b (when it starts data reception).

When it transmits a 'write' command to the slave device 230 via the I/F portion 112 and transmits the write data corresponding to the command, the control portion 411 sends the anomaly detecting portion 415 a write data transmission notification indicating that it has transmitted the write data. For example, the control portion 411 asserts the IRQ4 signal, thereby performing the write data transmission notification, when it stores write data in the transmitting buffer 411a in the control portion 411 and starts the process that transmits the write data to the master device 410 (when transmission starts).

The parameter setting portion 414 changes the value of a parameter for detecting communication anomalies according to the information indicating the command content held in the command holding portion 313. When the parameter setting portion 414 receives an enable signal from the command holding portion 313, it sets the parameter value in the anomaly detecting portion 415. In this embodiment, the value of the parameter for detecting communication anomalies is a value corresponding to the maximum time until transmission or reception starts. Here, the command content held in the command holding portion 313 indicates 'read' or 'write', so the parameter setting portion 414 sets the parameter to one value when the command content held in the command holding portion 313 indicates 'read' and to another value when the command content indicates 'write'. The set parameter value is supplied from the control portion 411 and is preferably changeable as necessary.

The anomaly detecting portion 415 measures time in the processing of a command. For example, the anomaly detecting portion 415 measures the time from a command reception notification from the control portion 411. The anomaly detecting portion 415 compares the measured time with the maximum time corresponding to the parameter value set by the parameter setting portion 414. If the measured time exceeds the maximum time, the anomaly detecting portion 415 decides that a communication anomaly has occurred, and notifies the initializing portion 317 of the communication anomaly.

When the anomaly detecting portion 415 receives a read data reception notification or a write data transmission notification from the control portion 411, it terminates time measurement.

As shown in FIG. 10, the anomaly detecting portion 415 includes an internal counter 415a and a comparator 415b.

Using a special clock, the internal counter 415a counts the time from assertion of the IRQ3 signal. The parameter value indicating the maximum time set by the parameter setting portion 414 is a count value reached when the special clock on which the internal counter 415a operates is counted up to the maximum time. The internal counter 415a stops counting when the IRQ4 signal is asserted.

When the count value in the internal counter 415a exceeds the parameter value set by the parameter setting portion 414, the comparator 415b issues a communication anomaly signal to notify the initializing portion 317 of a communication anomaly.

FIG. 15 is a flowchart illustrating the processing in the master device 410 in the fourth embodiment.

The control portion 411 generates a start condition via the I/F portion 112, and then transmits the slave address and command content (S50).

At this time, the control portion 411 also supplies the command holding portion 313 with the command content to be transmitted. The command holding portion 313 updates the register value so that it indicates the supplied command content (S51). For a read operation, the register value is '1'; for a write operation, the register value is '0'. Then the command holding portion 313 outputs an enable signal to the parameter setting portion 414.

The enable signal from the command holding portion 313 prompts the parameter setting portion 414 to test the command content bit held in the register. The parameter setting portion 414 sets the parameter value in the anomaly detecting portion 415 for determining communication anomalies to a value corresponding to the maximum time until transmission start or reception start according to the command content indicated by the tested bit (S52). Here, if the value of the command content bit is '1', in processing the read data, the parameter setting portion 414 sets, in the anomaly detecting portion 415, a parameter value corresponding to the maximum processing time and optimized for read operations. If the value of the command content bit is '0', the parameter setting portion 414 sets, in the anomaly detecting portion 415, a parameter value corresponding to the maximum processing time and optimized for write operations.

When it transmits a command to the slave device 230 via the I/F portion 112, the control portion 411 asserts the IRQ3 signal. The internal counter 415a in the anomaly detecting portion 415 detects the assertion of IRQ3 and starts counting (S53).

Next, the control portion 411 receives an ACK signal from the slave device 230 via the I/F portion 112 (S54). When it receives the ACK signal, the control portion 411 performs processing corresponding to the command content it transmitted to the slave device 230 in step S50.

Then the anomaly detecting portion 415 shown in FIG. 10 uses the internal counter 415a and the special clock to count time from the detection of the assertion of IRQ3. The comparator 415b checks whether or not the count value reached by the internal counter 415a exceeds the parameter value indicating the maximum processing time, set by the parameter setting portion 414 (S55). If the count value exceeds the parameter value (Yes in S55), the comparator 415b proceeds to the processing in step S56; if the count value does not exceed the parameter value (No in S55), the comparator 415b proceeds to the processing in step S57.

In step S56, the comparator 415b decides that a communication anomaly has occurred and outputs a communication anomaly signal to the initializing portion 317. When the communication anomaly signal from the anomaly detecting portion 415 is asserted, the initializing portion 317 outputs a reset signal to initialize the control portion 411. The control portion 411 is thereby initialized and starts IIC communication anew.

In step S57, the control portion 411 continues performing the processing for communication with the slave device 230.

The control portion 411 then determines whether communication with the slave device 230 has been executed or not (S58). For example, when the command to the slave device 230 indicates 'read', the control portion 411 determines that communication with the slave device 230 has been executed when the storing of the read data in the receiving buffer 411b starts. When the command from the slave device 230 indicates 'write', the control portion 411 determines that communication with the slave device 230 has been executed when transmission of the write data stored in the transmitting buffer 411a starts. If it determines that communication has been executed (Yes in S58), the control portion 411 terminates the flow of processing; if it determines that communication has not been executed (No in S58), the control portion 411 returns to the processing in step S55. When it determines that communication has been executed (Yes in S58), the control portion 411 asserts the IRQ4 signal. When it detects the assertion of IRQ4, the internal counter 415a in the anomaly detecting portion 415 stops counting.

As described above, as parameters for detecting anomalies, the communication system 400 according to the fourth embodiment uses a command transmission interrupt that is asserted when the master device 410 transmits a command, a receiving buffer interrupt that is asserted when the storing of read data in the receiving buffer 411b starts, and a transmitting buffer interrupt that is asserted when transmission of the write data stored in the transmitting buffer 411a starts, so it is possible to measure the actual time intervals from command transmission from the master device 410 to data transmission or reception accurately.

In the fourth embodiment, the anomaly detecting portion 415 includes an internal counter 415a that starts counting from IRQ3, but this configuration is not limiting; any configuration that enables the processing time from IRQ3 to be measured may be used.

The slave device 130 described in the first embodiment may be connected to the master device 410 described in the fourth embodiment.

In the fourth embodiment, when the command content indicates 'read', the parameter value set by the parameter setting portion 414 is a value corresponding to the maximum time from transmission of the command until reception of the read data, but the invention is not limited to this type of value. The parameter value set by the parameter setting portion 414 may be, for example, a value corresponding to the maximum time from transmission of the command until the completion of read data reception. In that case, for example, the control portion 411 stores read data in the receiving buffer 411b in the control portion 411 and transfers the data from the receiving buffer 411b to a memory or other device, not shown in the drawings, and asserts the IRQ 4 signal to perform read data reception notification when the receiving buffer 411b becomes empty.

In the fourth embodiment, when the command content indicates 'write', the parameter value set by the parameter setting portion 414 is a value corresponding to the maximum time from transmission of the command until the start of transmission of the write data, but the invention is not limited to this value. The parameter value set by the parameter setting portion 414 may be, for example, the maximum time from transmission of the command until the completion of the write transmission. In that case, for example, the control portion 411 stores the write data in the transmitting buffer 411a in the control portion 411 and transmits the write data to the slave device via the I/F portion 112, and asserts the IRQ 4 signal to perform write data transmission notification when the transmitting buffer 411a becomes empty.

In the first-fourth embodiments described above, the parameter values are supplied from the slave devices 131, 231, 311, 411 to the parameter setting portions 133, 233, 314, 414, but the read parameter value and the write parameter value may be fixed values. In that case, the parameter values may be stored in a memory, not shown in the drawings, in the parameter setting portion 133, 233, 314, 414.

REFERENCE CHARACTERS 100, 200, 300, 400: communication system, 110, 310, 410: master device, 111, 311, 411: control portion, 311a, 411a: transmitting buffer, 311b, 411b: receiving buffer, 112: I/F portion, 313: command holding portion, 314: parameter setting portion, 315, 415: anomaly detecting portion, 315a, 415a: internal counter, 315b, 415b: comparator, 316: clock generator, 317: initializing portion, 130, 230: slave device, 131, 231: controller, 131a, 231a: transmitting buffer, 131b, 231b: receiving buffer, 132: command holding portion, 132a: start condition recognition portion, 132b: internal counter, 132c: register, 133: parameter setting portion, 134, 234: anomaly detecting portion, 134a, 234a: internal counter, 134b, 234b: comparator, 135: clock generator, 136: initializing portion, 137 I/F portion, 138: computing operation processor.

What is claimed is:

1. A slave device operative in a slave mode in accordance with an IIC (Inter Integrated Circuit) protocol, comprising a processor performing the functions of:
    a command holding circuit for identifying a bit indicating command content from a serial data line signal transmitted to the slave device from a master device according to a serial clock line signal transmitted to the slave device from the master device and holding the command content, the master device being operative in a master mode in accordance with the IIC protocol;
    a parameter setting circuit for setting, as values of a parameter for detecting anomalies, different values according to whether the command content indicates a read operation or a write operation; and
    an anomaly detecting circuit for detecting the anomalies by comparing a time corresponding to the parameter value set by the parameter setting circuit with time measured in processing performed responsive to the commands; wherein
    the anomaly detecting circuit includes,
    a counter which counts time for which the serial clock line signal is held at a predetermined level, and
    a comparator which issues a communication anomaly signal when the time counted by the counter exceeds the time corresponding to the parameter value set by the parameter setting portion;
    wherein the anomaly detecting circuit detects the anomalies when the comparator issues the communication anomaly signal.

2. The slave device of claim 1, wherein:
    the parameter setting circuit makes the time corresponding to the parameter value set when the command content indicates a read operation longer than the time corresponding to the parameter value set when the command content indicates a write operation.

3. The slave device of claim 1, wherein the processor further performs the function of an interface circuit for performing communication via a serial clock line and a serial data line, wherein:
    when the command content indicates a write operation, the parameter value is a threshold value corresponding to a time for which a signal on the serial clock line remains at a prescribed level while write data are being processed;
    when the command content indicates a read operation, the parameter value is a threshold value corresponding to the time for which the signal on the serial clock line remains at the prescribed level while read data are being processed; and
    the anomaly detecting circuit measures the time for which the signal on the serial clock line remains at the prescribed level.

4. The slave device of claim 1, wherein:
    when the command content indicates a write operation, the parameter value is a threshold value corresponding to a time from command reception until reception of write data, and
    the anomaly detecting circuit measures the time from command reception until the reception of the write data; and
    when the command content indicates a read operation, the parameter value is a threshold value corresponding to the time from command reception until transmission of read data, and
    the anomaly detecting circuit measures the time from command reception until the transmission of the read data.

5. The slave device of claim 1, wherein:
    the anomaly detecting circuit includes a counter for measuring the time, and detects an anomaly when a value of the counter exceeds the parameter value.

6. The slave device of claim 1, wherein the processor further performs the function of an initializing circuit that resets communication with the master device when the anomaly detecting circuit detects an anomaly.

7. A master device operative in a master mode in accordance with an IIC (Inter Integrated Circuit) protocol, comprising processor performing the function of:
    a parameter setting circuit that sets different values according to command content of commands that the master device transmits to a slave device operating in a slave mode in accordance with the IIC protocol; and
    an anomaly detecting circuit that detects anomalies by comparing a time corresponding to a parameter value set by the parameter setting circuit with a time measured in processing performed responsive to the commands.

8. The master device of claim 7, wherein:
    the parameter setting circuit makes the time corresponding to the parameter value set when the command content indicates a read operation longer than the time corresponding to the parameter value when the command content indicates a write operation.

9. The master device of claim 7, wherein the processor further performs the function of an interface circuit for performing communication via a serial clock line and a serial data line, wherein:
when the command content indicates a write operation, the parameter value is a threshold value corresponding to a time for which a signal on the serial clock line remains at a prescribed level while write data are being processed;
when the command content indicates a read operation, the parameter value is a threshold value corresponding to the time for which the signal on the serial clock line remains at the prescribed level while read data are being processed; and
the anomaly detecting circuit measures the time for which the signal on the serial clock line remains at the prescribed level.

10. The master device of claim 7, wherein:
when the command content indicates a write operation, the parameter value is a threshold value corresponding to a time from command transmission until transmission of write data, and
the anomaly detecting circuit measures the time from command transmission until the transmission of the write data; and
when the command content indicates a read operation,
the parameter value is a threshold value corresponding to the time from command transmission until reception of read data, and
the anomaly detecting circuit measures the time from command transmission until the reception of the read data.

11. The master device of claim 7, wherein:
the anomaly detecting circuit includes a counter for measuring the time, and detects an anomaly when a value of the counter exceeds the parameter value.

12. The master device of claim 7, wherein the processor further performs the function of an initializing circuit that resets communication with the slave device when the anomaly detecting circuit detects an anomaly.

13. The master device of claim 7, wherein:
the parameter setting portion sets the different values depending on whether the command content is a read command or a write command.

14. A communication method carried out by a slave device operating in a slave mode in accordance with an IIC (Inter Integrated Circuit) protocol, comprising:
a parameter setting process for setting different values according to command content of commands transmitted from a master device operating in a master mode in accordance with the IIC protocol, as parameter values for detecting anomalies; and
an anomaly detecting process for detecting the anomalies by comparing a time corresponding to a parameter value set by the parameter setting process with a time measured in processing performed responsive to the commands.

15. The communication method of claim 14, wherein the parameter setting process makes the time corresponding to the parameter value set when the command content indicates a read operation longer than the time corresponding to the parameter value set when the command content indicates a write operation.

16. The communication method of claim 14, wherein:
when the command content indicates a write operation, the parameter value is a threshold value corresponding to a time for which a signal on the serial clock line remains at a prescribed level while write data are being processed;
when the command content indicates a read operation, the parameter value is a threshold value corresponding to the time for which the signal on the serial clock line remains at the prescribed level while read data are being processed; and
the anomaly detecting process measures the time for which the signal on the serial clock line remains at the prescribed level.

17. The communication method of claim 14, wherein:
when the command content indicates a write operation, the parameter value is a threshold value corresponding to a time from command reception until reception of write data;
the anomaly detecting process measures the time from command reception until the reception of the write data; and
when the command content indicates a read operation,
the parameter value is a threshold value corresponding to the time from command reception until transmission of read data, and
the anomaly detecting process measures the time from command reception until the transmission of the read data.

18. A communication method performed by a master device operating in a master mode in accordance with an IIC (Inter Integrated Circuit) protocol, comprising:
a parameter setting process for setting different values according to command content of commands transmitted to a slave device operating in a slave mode in accordance with the IIC protocol, as parameter values for detecting anomalies; and
an anomaly detecting process for detecting an anomaly by comparing a time corresponding to a parameter value set by the parameter setting process with a time measured in processing performed responsive to the commands.

19. The communication method of claim 18, wherein the parameter setting process makes the time corresponding to the parameter value set when the command content indicates a read operation longer than the time corresponding to the parameter value set when the command content indicates a write operation.

20. The communication method of claim 18, wherein:
when the command content indicates a write operation, the parameter value is a threshold value corresponding to a time for which a signal on the serial clock line remains at a prescribed level while write data are being processed;
when the command content indicates a read operation, the parameter value is a threshold value corresponding to the time for which the signal on the serial clock line remains at the prescribed level while read data are being processed; and
the anomaly detecting process measures the time for which the signal on the serial clock line remains at the prescribed level.

21. The communication method of claim 18, wherein:
when the command content indicates a write operation, the parameter value is a threshold value corresponding to a time from command transmission until transmission of write data, and
the anomaly detecting process measures the time from command reception until the transmission of the write data; and when the command content indicates a read operation, the parameter value is a threshold value corresponding to the time from command transmission until reception of read data, and the anomaly detecting process measures the time from command transmission until the reception of the read data.

\* \* \* \* \*